US006490049B1

(12) United States Patent
Cunnagin et al.

(10) Patent No.: US 6,490,049 B1
(45) Date of Patent: Dec. 3, 2002

(54) IMAGE FORMING APPARATUS WITH CONTROLLED ACCESS

(75) Inventors: Stephen Kelly Cunnagin, Lexington, KY (US); Scott Michael Heydinger, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 940 days.

(21) Appl. No.: 08/628,177

(22) Filed: Apr. 4, 1996

(51) Int. Cl.[7] ................................................ G06F 15/00

(52) U.S. Cl. ...................................... 358/1.13; 358/1.14

(58) Field of Search ................................ 395/112, 113, 395/114, 117, 109, 102, 101; 358/437, 468, 407, 402, 403; 380/55, 43, 4, 25, 23; 340/825.31; 355/35, 38, 68

(56) References Cited

U.S. PATENT DOCUMENTS

| | | | | |
|---|---|---|---|---|
| 4,179,214 A | * 12/1979 | Poné, Jr. | | 355/35 |
| 4,630,946 A | 12/1986 | Mizutani et al. | | 400/121 |
| 4,812,841 A | 3/1989 | Chen | | 340/825.31 |
| 4,813,912 A | 3/1989 | Chickneas et al. | | 364/464.02 |
| 4,959,860 A | 9/1990 | Watters et al. | | 380/4 |
| 5,075,875 A | * 12/1991 | Love et al. | | 395/117 |
| 5,091,939 A | 2/1992 | Cole et al. | | 380/25 |
| 5,097,506 A | 3/1992 | Kaiser, Jr. et al. | | 380/25 |
| 5,132,727 A | 7/1992 | Benker | | 355/133 |
| 5,355,200 A | 10/1994 | Ohba et al. | | 355/246 |
| 5,475,801 A | * 12/1995 | Brindle et al. | | 395/114 |

FOREIGN PATENT DOCUMENTS

| | | | |
|---|---|---|---|
| EP | 0 536 050 A2 | 4/1993 | G03G/15/00 |

* cited by examiner

*Primary Examiner*—Gabriel Garcia
(74) *Attorney, Agent, or Firm*—Taylor & Aust, P.C.

(57) ABSTRACT

The invention is directed to an image forming apparatus including a print engine operable in at least two modes, and an access control system connected to and controlling the print engine. The access control system includes an access control key for allowing selective and discriminate switching of the print engine from one of the at least two modes to an other of the at least two modes, such as from an economy mode to a high quality mode, or vice versa.

16 Claims, 3 Drawing Sheets

IMAGE FORMING APPARATUS WITH CONTROLLED ACCESS

BACKGROUND OF THE INVENTION

1. Field of the Invention

The present invention relates to image forming apparatus, and, more particularly, to printers having a controllable operation.

2. Description of the Related Art

An image forming apparatus, such as a printer, may typically be selectively operated in one of a plurality of different modes. In the case of an ink jet printer, one such mode may be a high quality mode which provides a high quality print job. Alternatively, the ink jet printer may be operated in a relatively lower quality ink saver mode wherein certain available pixels are essentially "blocked out" such that ink is not deposited on the print medium at a corresponding location. In the case of an electrophotographic printer (e.g., a laser printer), the printer may similarly be operated in different modes to use different amounts of toner for a specific job.

With conventional printers, the printer is usually switched from one mode of operation to another by depressing a button on the printer, or alternatively sending a signal from an attached host computer to the printer. With such known printers, however, there is no controlled access to the printer for switching from one mode of operation to another. Any person may either depress a button on the printer or send an appropriate signal from the host computer to the printer to switch from one mode of operation to another.

A problem with known printers is that it is not possible to prevent a person from utilizing a printer in a mode of operation which consumes a relatively large amount of a consumable supply, such as ink, toner or paper, over a predetermined unit of time. For example, a color ink jet printer attached to a host computer may be used primarily for producing business-type graphics, presentations, etc. Nonetheless, children may also have access to the printer and use the same for printing created artwork, clip art, etc. Although the activities associated with such print jobs provide children with entertainment and education, the person desiring to use the printer for business purposes may wish to limit use of the consumable supplies in the printer so that adequate consumable supplies are later available for the production of business-type work product.

What is needed in the art is an image forming apparatus, such as a printer, which allows controlled access to selected features and/or (sub)systems of the printer.

SUMMARY OF THE INVENTION

The present invention provides an image forming apparatus, such as a printer, having controlled access to selected features and/or (sub)systems. The controlled access allows a selected usage of consumable supplies, such as ink or toner.

The invention comprises, in one form thereof, an image forming apparatus including a print engine operable in at least two modes, and an access control system connected to and controlling the print engine. The access control system includes an access control key for allowing selective and discriminate switching of the print engine from one of the at least two modes to an other of the at least two modes, such as from an economy mode to a high quality mode, or vice versa.

An advantage of the present invention is that controlled access is provided to certain printer features and/or (sub) systems.

Another advantage is that a consumption rate of consumable supplies, such as ink or toner, may be controlled.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
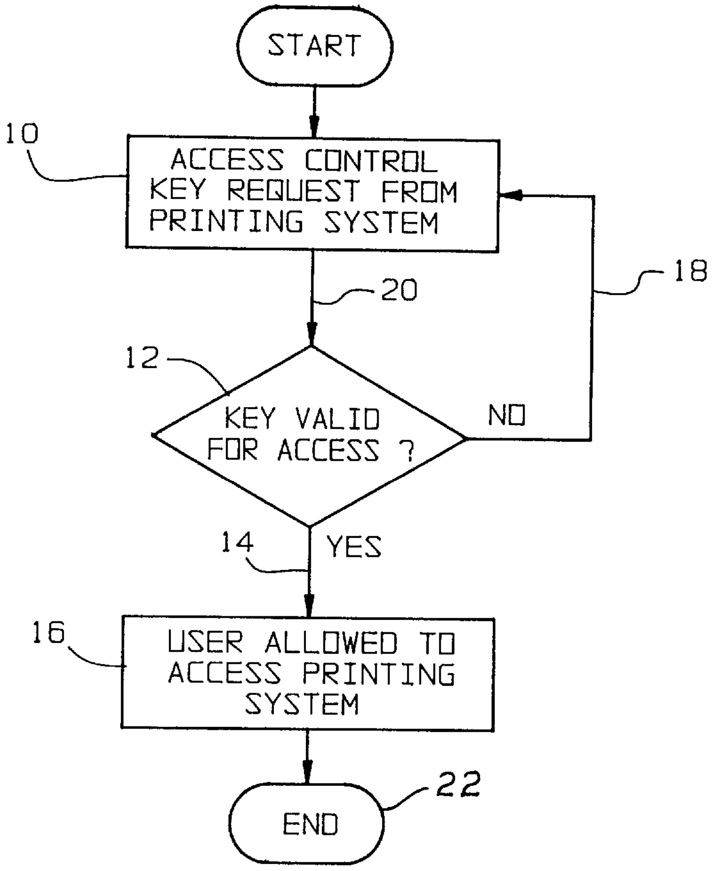
FIG. 1 is a basic flowchart of an embodiment of the access control system of the present invention.

Referring now to the drawings and particularly to FIG. 1, there is shown a basic flowchart of an embodiment of an access control system of the present invention. The access control system provides selective and discriminate access to selected features and/or (sub)systems of an image forming apparatus, such as a printer, and thereby is capable of controlling a rate of consumption of consumable supplies, such as ink, toner, paper, etc.

Where in this application the terms "control", "controlling" or the like are used, it is to be understood that such terms may include the meaning of the terms "regulate", "regulating", etc. That is, such "control" may or may not include a feedback loop. Moreover, it is also to be understood, and it will be appreciated by those skilled in the art, that the methodology and logic of the present invention described herein may be carried out using any number of structural configurations such as electronic hardware, software, and/or firmware, or the like.

In contrast with a conventional printer which simply accepts a received signal and switches from one mode of operation to another, the access control system of the present invention requests and interfaces with an access control key to be provided by a user (block 10). As will be described in more detail hereinafter, the access control key can be in the form of an electronic access control key such as a password, or a mechanical access control key such as a turnkey or coin. If the access control key interfaced with the printer by a user is valid (decision block 12 and line 14), then the user is allowed access to certain features and/or (sub)systems of the printer (block 16). On the other hand, if the access control key is not valid (line 18), then control passes back to block 10. Block 10, line 20, decision block 12 and line 18 therefore define a wait state during which the printer waits for a proper access control key to be interfaced therewith by a user.

If a user is allowed access to the printing system, as indicated by block 16, then certain features and/or (sub) systems of the printer may be accessed and modified. For example, the printer may be switched from one mode of operation to another wherein the consumption rate of a consumable supply such as ink, toner or paper is changed. Since the printer also operates at a known throughput rate, the consumable supply may also be in the form of a period of time which the printer may be operated. After accessing the printing system, and changing a mode of operation (if desired), the control ends (block 22). The same logic as shown in FIG. 1 must again be followed if the mode of operation of the printer is to be changed.

Figure 2:
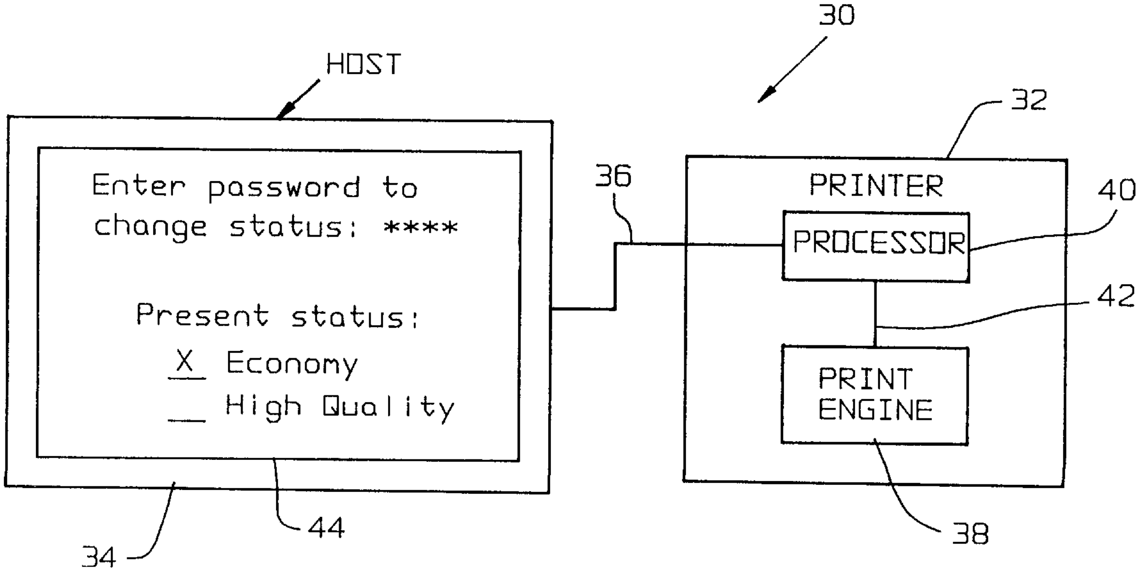
FIG. 2 is a schematic illustration of an embodiment of an access control system of the present invention including an electronic access key.

FIG. 2 is a schematic illustration of an embodiment of an access control system 30 of the present invention including an electronic access key. Access control system 30 includes a printer 32 which is connected to a host computer 34 via a conductor 36. Printer 32 includes a print engine 38 used for printing an image on a print medium such as paper (not shown). In the case of an ink jet printer, print engine 38 includes an ink jet cartridge or pen with a consumable supply of ink therein. In the case of a laser printer, print engine 38 includes an electrophotographic assembly with a consumable supply of toner for transferring a latent image to the print medium.

Printer 32 also includes a processor 40 which is connected to and controls print engine 38 via a conductor 42. Processor 40 is connected to host computer 34 via line 36 and receives input data therefrom. Of course, printer 32 may also include other structures, not shown, such as a data buffer, etc.

Printer 32 is operable in at least two modes of operation, such as an economy mode and a high quality mode. The economy mode of operation uses less of a consumable supply than the high quality mode. The consumable supply may be selectively chosen as corresponding to ink, toner, paper or time, as indicated above. Since the present invention does not directly relate to the consumable supply, but rather to a method and system for providing controlled access to a consumable supply, these consumable supplies are not shown in the drawings.

In the case where printer 32 corresponds to an ink jet printer, the high quality mode may be a "shingled" or band interlaced mode in which the nozzles of an ink jet cartridge are selectively fired over multiple passes of the printhead across the print medium. Selected ones of the nozzles are fired during one pass of the printhead, while selected others of the nozzles are fired during another pass of the printhead. The basic concept of "shingling" is known in the art as providing a high quality print job. Alternatively, the economy mode for an ink jet printer may correspond to an ink saver mode in which only certain of the addressable pixels making up a print image are actually used during the printing process. That is, the print image may be divided into a number of addressable pixels for deciding whether or not to jet an ink droplet onto the print medium at the particular addressable pixel. During an ink saver mode, only a predetermined array of the addressable pixels are actually utilized for jetting ink onto the print medium. One such known ink saver mode skips every other addressable pixel for jetting ink onto the print medium.

Host computer 34 includes a display screen 44 on which textual information such as that shown in FIG. 2 may be displayed to a user. This may be accomplished with a software driver provided with the printer which is loaded onto the host computer. An electronic access control key in the form of a password request is displayed on screen 44 when a user desires to access the printer system to change the mode of operation thereof. In addition, a status indicator corresponding to the present mode of operation is also displayed on screen 44. In the embodiment shown in FIG. 2, the status indicator is displayed as a mode of operation for an economy mode or a high quality mode, although other modes of operation are also possible. The correct password can either be stored as an (encrypted) data file on the host computer or in a non-volatile (NV) RAM memory in printer 32. The NV RAM memory in printer 32 may be incorporated into processor 40. If an appropriate password is entered into host computer 34, such as by using a keyboard, then an electrical signal is transmitted to processor 40 over conductor 36. The user is then allowed access to certain features and/or (sub)systems of the printer so that the printer may be changed from one operating mode to another.

Figure 3:
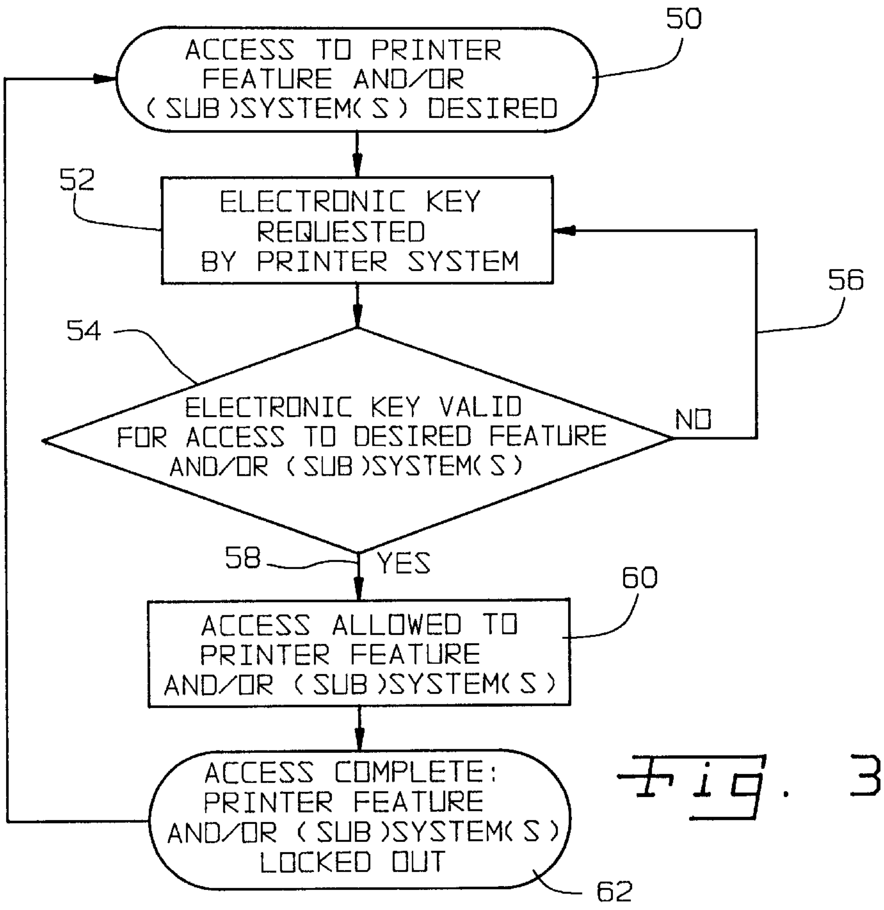
FIG. 3 is a flowchart of the access control system shown in FIG. 2.

FIG. 3 illustrates a flow chart of access control system 30 shown in FIG. 2. First, the user desires access to a feature and/or (sub)system of printer 32 (block 50). The printer system then requests an electronic access control key prior to allowing the printer feature and/or (sub)system to be accessed (block 52). The electronic key in FIG. 2 is in the form of a password request from the printer system. The password request can originate from either the software driver located on host computer 34 or processor 40 located in printer 32. A decision is then made as to whether the password is valid for access to the desired feature and/or (sub)system (decision block 54). If the result is NO (line 56), control passes back to block 52. On the other hand, if the electronic key is valid and the result from decision block 54 is YES (line 58), then the user is allowed access to the printer feature and/or (sub)systems (block 60). For example, the user may change the mode of operation of printer 32 from an economy mode to a high quality mode, or vice versa. After the user is allowed access to the printer feature and/or (sub)systems, the printer feature and/or (sub)systems are locked out (block 62) and control passes back to block 50.

In the embodiment of access control system 30 shown in FIGS. 2 and 3, the electronic access control key is in the form of a password entered into host computer 34. However, it will also be appreciated that host computer 34 provides a corresponding electrical signal over conductor 36 to processor 40 of printer 32. Since the signal transmitted over conductor 36 to processor 40 corresponds to the password, it is also possible to define the electronic access control key as being the value of a particular electrical signal transmitted to processor 40.

Figure 4:
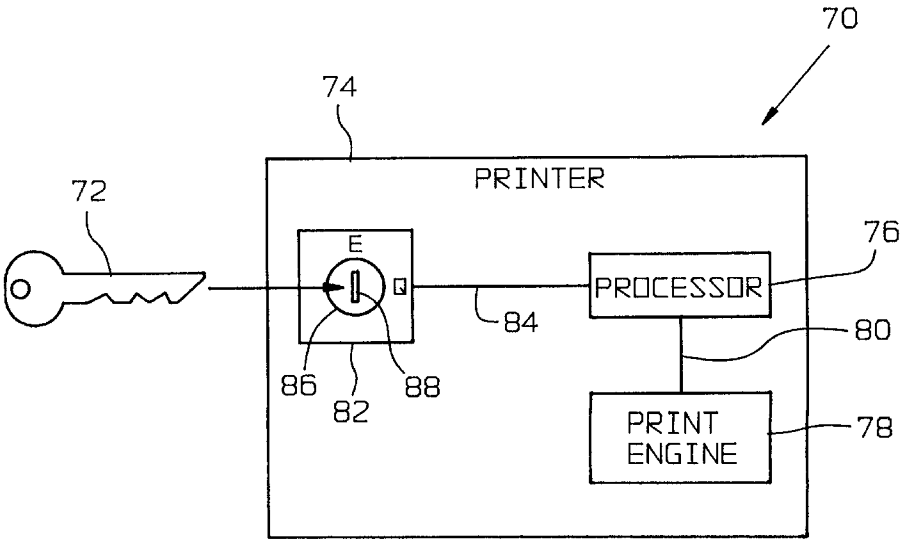
FIG. 4 is a schematic illustration of an embodiment of an access control system of the present invention including a mechanical access key.

Referring now to FIG. 4, there is shown a schematic illustration of an embodiment of an access control system 70 of the present invention including a mechanical access control key 72 which is interfaced with a printer 74. More particularly, printer 74 includes a processor 76 which is connected to a print engine 78 via a conductor 80. Processor 76 and print engine 78 are similar in structure and function to processor 40 and print engine 38 described above with reference to FIG. 2. Processor 76 is also connected to a mechanical key input device 82 via a conductor 84. Mechanical key input device 82 includes a rotatable tumbler 86 which is movable between two positions corresponding to an economy mode and a high quality mode of printing. Mechanical access control key 72, which is in the form of a turnkey in the embodiment shown, is insertable into slot 88 of tumbler 86. Tumbler 86 is in a position corresponding to the economy mode as shown in FIG. 4, and can also be rotated clockwise approximately 90 degrees to a position corresponding to the high quality mode of printer 74. Mechanical key input device is configured to provide an output signal which is transmitted over conductor 84 to processor 76. The output signal is indicative of the selected mode of operation of printer 74. Processor 76 controls print engine 78 via conductor 80 to effect a desired mode of operation. Mechanical access control key 72 therefore provides selective and discriminate switching of print engine 78 from one mode of operation to another mode, such as from an economy mode to a high quality mode.

Figure 5:
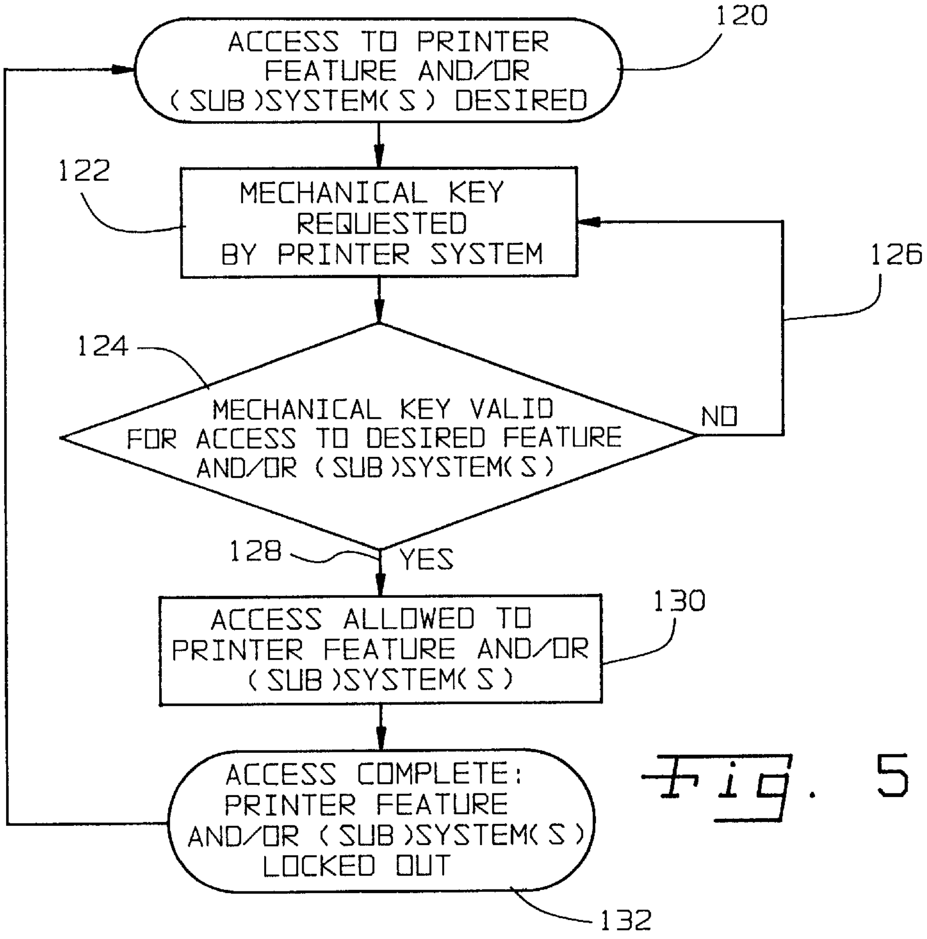
FIG. 5 is a flowchart of the access control system shown in FIG. 4.

FIG. 5 illustrates a flowchart for access control system 70 shown in FIG. 4. First, the user desires access to a feature and/or (sub)system of printer 70 (block 120). The printer system then requests a mechanical access control key prior to allowing the printer feature and/or (sub)system to be accessed (block 122). The mechanical access key in FIG. 4 is in the form of a turn key which is inserted into slot 88 of mechanical key input device 82. A decision is then made as to whether the-mechanical access key is valid for access to the desired feature and/or (sub)system (decision block 124). If the result is NO (line 126), control passes back to block 122. On the other hand, if the mechanical access key is valid and the result from decision block 124 is YES (line 128), then the user is allowed access to the printer feature and/or (sub)systems (block 130). For example, the user may change the mode of operation of printer 70 form an economy mode to a high quality mode, or vice versa. After the user is allowed access to the printer feature and/or (sub)systems, the printer feature and/or (sub)systems are locked out (block 132) and control passes back to block 120.

Figure 6:
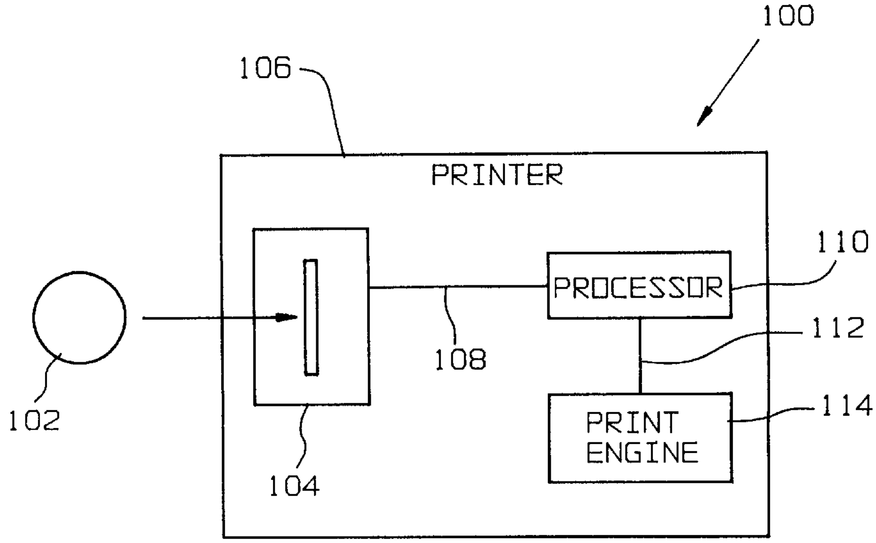
FIG. 6 is a schematic illustration of an embodiment of an access control system of the present invention with another variant of a mechanical access key.

FIG. 6 schematically illustrates another embodiment of an access control system 100 of the present invention including a mechanical access control key 102 in the form of a coin. Coin 102 is interfaced with a coin input device 104 of a printer 106. Coin input device 104 is connected via conductor 108 to a processor 110 which in turn is connected via conductor 112 to print engine 114. Coin input device 104 includes appropriate mechanical sensors and circuitry (not shown) to determine a total monetary amount of coins 102 inserted into coin input device 104. The monetary value corresponding to the number of coins 102 inserted into coin input device 104 is used to determine when a feature and/or (sub)system of printer 106 may be accessed for use or modification. For example, the monetary value of the number of coins 102 inserted into coin input device 104 can be used to control access to a mode of operation of the printer such as an economy mode or high quality mode, the total number of sheets which may be used, or a time period during which the printer may be used. The monetary value can also be used to allow a user to switch from one mode of operation to another during use, such as from an economy mode to a high quality mode, based on the monetary value remaining at the time a request to change the mode of operation is made.

The logic and method of operation for printer 100 shown in FIG. 6 is the same as that illustrated by the flowchart in FIG. 5.

In the embodiments shown in FIGS. 4 and 6, respectively, the mechanical access control key is in the form of a turnkey 72 and coin 102, respectively. However, it is also to be understood that other mechanical access control keys may also be utilized. Other examples may include a magnetically coded access card, or dip switches on the printer having limited access thereto.

The access control system of the present invention has many possible applications. For example, a parent may wish to limit the amount of consumable supplies which a child is allowed to use. Moreover, a technology administrator for a business may wish to control which persons in the business are allowed to use the printer in a specific mode of operation. Further, it is possible that hotels may place a computer and printer within a room for use by a patron. The printer could be locked out of operation unless a specific access control key is entered by the patron. Other uses are also possible.

Further, with regard to the embodiment of access control system 30 shown in FIG. 2, host computer 34 is directly connected to printer 32 via conductor 36, such as a parallel or serial cable. However, it is also to be understood that printer 32 may be connected to and controlled by a computer which is not directly attached thereto. For example, it may be desirable to control printer 32 over a local area network (LAN). It may also be possible to use a tone generating chip such as found in a conventional telephone to access a remotely located system including a tone demodulation circuit for entering a pass code allowing a feature and/or (sub)system of a printer located at the remote station to be accessed (similar to accessing an electronic voice mail system using a touch tone telephone).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An image forming apparatus, comprising:

a print engine operable in an economy mode of printing and a high quality mode of printing, said economy mode using less of a consumable supply than said high quality mode; and an access control system connected to and controlling said print engine, said access control system including an access control key for allowing selective and discriminate switching of said print engine from one of said economy mode and said high quality mode to an other of said economy mode and said high quality mode.

2. The image forming apparatus of claim 1, wherein said access control key comprises an electronic access control key.

3. The image forming apparatus of claim 2, wherein said electronic access control key comprises an electrical signal.

4. The image forming apparatus of claim 2, wherein said electronic access control key comprises a password.

5. The image forming apparatus of claim 1, wherein said access control key comprises a mechanical access control key.

6. The image forming apparatus of claim 5, wherein said mechanical access control key comprises a turn key.

7. The image forming apparatus of claim 5, wherein said mechanical access control key comprises a coin.

8. The image forming apparatus of claim 1, wherein the image forming apparatus comprises a printer.

9. The image forming apparatus of claim 1, wherein said consumable supply comprises ink, and wherein said high quality mode comprises a band interlaced mode.

10. The image forming apparatus of claim 1, wherein said consumable supply comprises ink, and wherein said economy mode comprises an ink saver mode.

11. The image forming apparatus of claim 1, wherein said consumable supply comprises ink.

12. The image forming apparatus of claim 1, wherein said consumable supply comprises toner.

13. The image forming apparatus of claim 1, wherein said consumable supply comprises a number of sheets of paper which can be printed on.

14. An image forming apparatus, comprising:

a print engine operable in an economy mode of printing and a high quality mode of printing, said economy mode using less of a consumable supply than said high quality mode, said consumable supply comprising an amount of time which said image forming apparatus can be operated; and an access control system connected to and controlling said print engine, said access control system including an access control key for allowing selective and discriminate switching of said print engine from one of said economy mode and said high quality mode to an other of said economy mode and said high quality mode.

15. An image forming apparatus, comprising:

a print engine operable in at least two modes, said at least two modes comprising an economy mode and a high quality mode, said economy mode using less of a consumable supply than said high quality mode, said consumable supply comprising time; and an access control system connected to and controlling said print engine, said access control system including an access control key for allowing selective and discriminate switching of said print engine from one of said at least two modes to an other of said at least two modes.

16. A method of forming an image on a print medium, comprising the steps of:

providing a print engine operable in an economy mode of printing and a high quality mode of printing, said economy mode using less of a consumable supply than said high quality mode;

providing an access control system connected to and controlling said print engine;

providing an access control key;

interfacing said access control key with said access control system; and switching said print engine from one of said economy mode and said high quality mode to an other of said economy mode and said high quality mode using said access control system, dependent on said interfaced access control key.

* * * * *